(12) United States Patent
Chute et al.

(10) Patent No.: US 9,671,623 B2
(45) Date of Patent: Jun. 6, 2017

(54) FOLDABLE ATTACHABLE FRONT FOR EYEGLASSES

(71) Applicant: SunBird, LLC, Sherman Oaks, CA (US)

(72) Inventors: J. David Chute, Atherton, CA (US); Stephen Kurtin, Sherman Oaks, CA (US); Jason Clerk, Toronto (CA); Deni Crescenzi, Toronto (CA)

(73) Assignee: SunBird, LLC, Sherman Oaks, CA (US)

( * ) Notice: Subject to any disclaimer, the term of this patent is extended or adjusted under 35 U.S.C. 154(b) by 0 days.

(21) Appl. No.: 15/344,946

(22) Filed: Nov. 7, 2016

(65) Prior Publication Data

US 2017/0052392 A1    Feb. 23, 2017

Related U.S. Application Data

(62) Division of application No. 14/961,455, filed on Dec. 7, 2015.

(60) Provisional application No. 62/125,872, filed on Feb. 2, 2015.

(51) Int. Cl.
| G02C 9/00 | (2006.01) |
| G02C 9/04 | (2006.01) |
| G02C 5/00 | (2006.01) |
| G02C 5/08 | (2006.01) |
| G02C 7/08 | (2006.01) |
| G02C 7/10 | (2006.01) |
| G02C 1/00 | (2006.01) |

(52) U.S. Cl.
CPC ............... *G02C 9/04* (2013.01); *G02C 5/006* (2013.01); *G02C 5/08* (2013.01); *G02C 7/086* (2013.01); *G02C 7/10* (2013.01); *G02C 1/10* (2013.01); *G02C 2200/02* (2013.01); *G02C 2200/08* (2013.01)

(58) Field of Classification Search
CPC . G02C 1/06; G02C 5/006; G02C 5/02; G02C 5/08; G02C 7/10; G02C 9/04
USPC .......................... 351/63, 68, 69, 76, 77, 127
See application file for complete search history.

(56) References Cited

U.S. PATENT DOCUMENTS

| 1,230,555 | A | | 6/1917 | Brennecke | |
| 1,838,646 | A | * | 12/1931 | Walsh, Jr. ............... | G02C 5/045 2/445 |
| 1,936,319 | A | | 11/1933 | Wingate | |
| 5,642,177 | A | | 6/1997 | Nishioka | |
| 5,896,185 | A | | 4/1999 | Huang | |
| 6,022,105 | A | * | 2/2000 | Lin ......................... | G02C 5/045 351/128 |
| 6,409,335 | B1 | | 6/2002 | Lipawsky | |
| 6,893,124 | B1 | | 5/2005 | Kurtin | |
| 7,165,838 | B1 | | 1/2007 | Sapp | |
| 7,455,402 | B2 | | 11/2008 | Gerber et al. | |
| 7,731,356 | B1 | | 6/2010 | Gilbert | |
| 7,886,405 | B2 | | 2/2011 | Cescon | |

(Continued)

*Primary Examiner* — Huy K Mai
(74) *Attorney, Agent, or Firm* — Saul Epstein

(57) ABSTRACT

A removable attachment for eyeglasses. The attachment is held to the parent eyeglasses by magnets. The bridge of the attachment includes ball joints that allow the attachment to fold for storage while not in use, and also allow the lens units of the attachment to twist about a horizontal line with respect to the bridge thereby enabling the lens units to conform to misaligned parent lenses.

7 Claims, 5 Drawing Sheets

(56) References Cited

U.S. PATENT DOCUMENTS

| | | | |
|---|---|---|---|
| 2004/0100615 A1* | 5/2004 | Conner | G02C 5/08 |
| | | | 351/63 |
| 2004/0141148 A1 | 7/2004 | Chou | |
| 2004/0263775 A1 | 12/2004 | Sahney | |
| 2007/0211209 A1* | 9/2007 | Liu | G02C 9/04 |
| | | | 351/47 |
| 2014/0340628 A1 | 11/2014 | Huang | |
| 2014/0368784 A1 | 12/2014 | Rubin | |

* cited by examiner

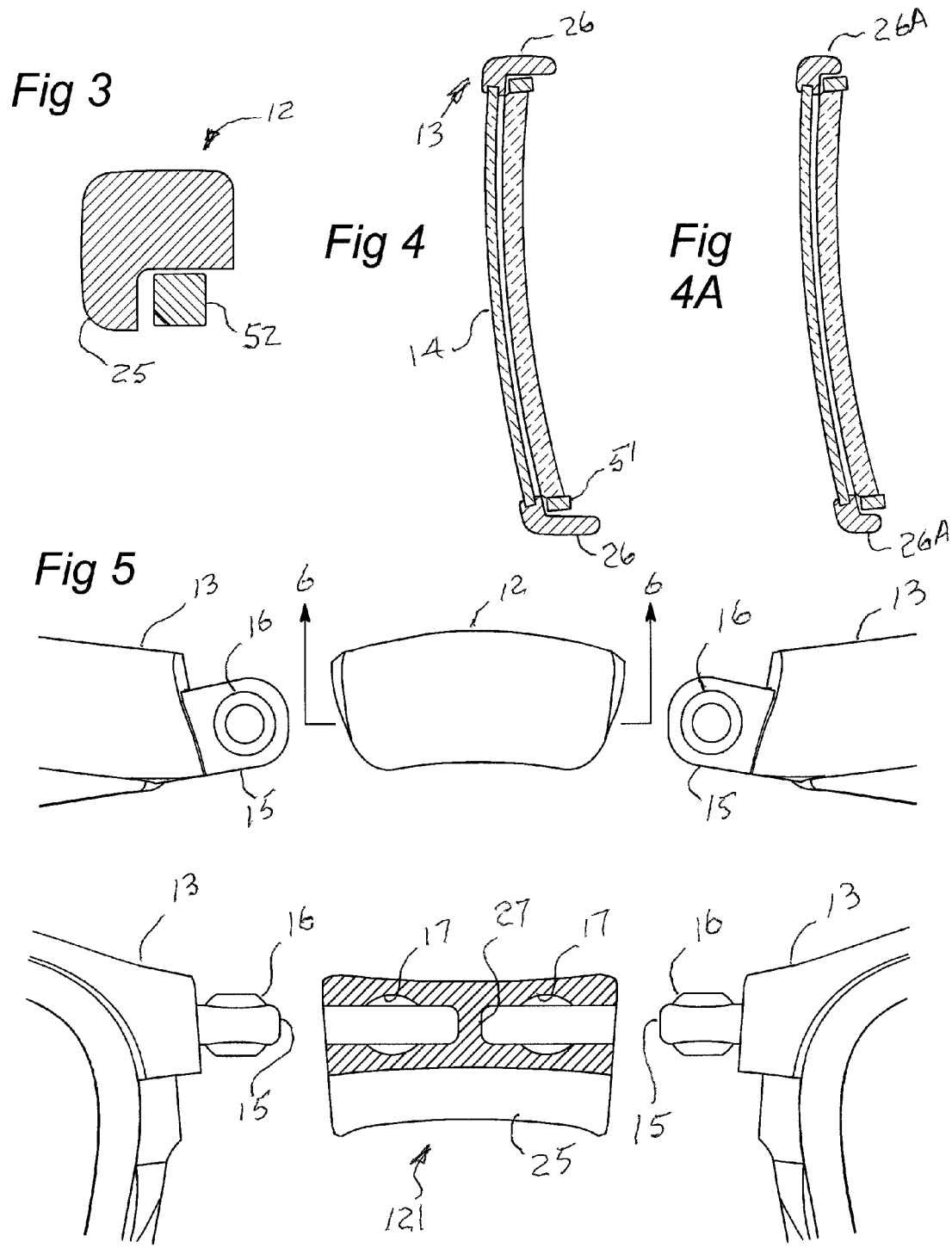

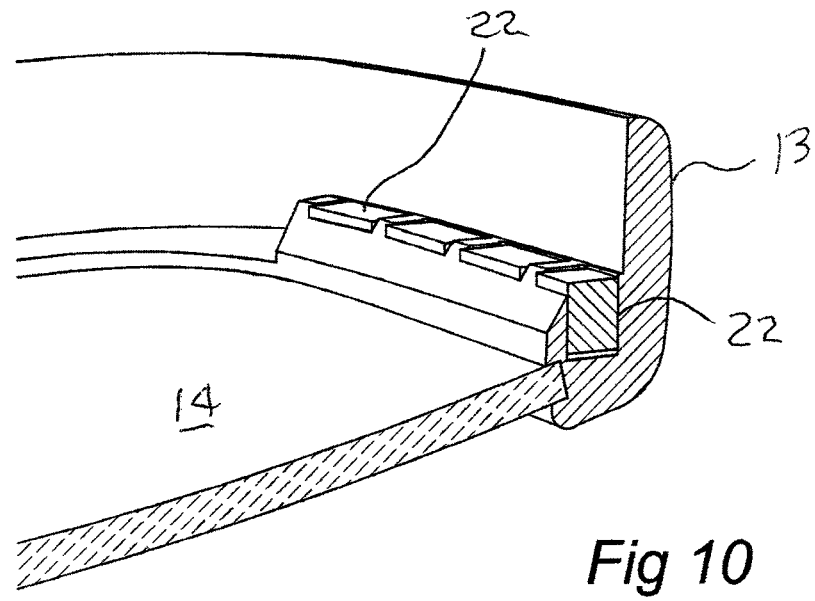
Fig 10
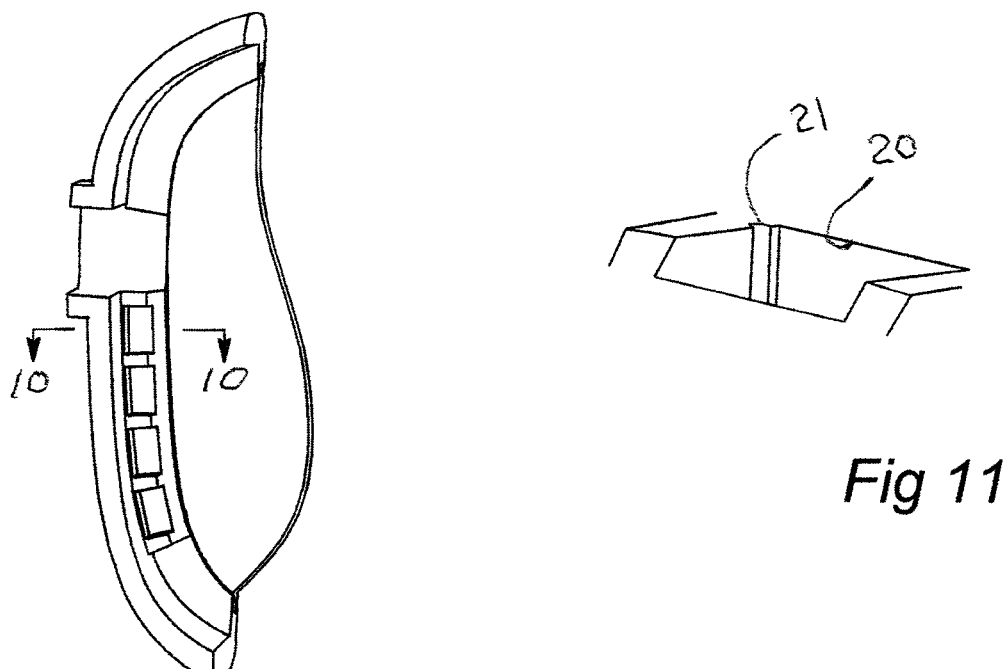
Fig 11
Fig 9

FOLDABLE ATTACHABLE FRONT FOR EYEGLASSES

RELATED APPLICATIONS

This application is a division of and claims the benefit under 35 USC §119(e) of the filing date of U.S. Non-Provisional patent application Ser. No. 14/961,455, entitled "Attachable Front for Eyeglasses", filed Dec. 7, 2015. This application also claims the benefit of the filing date of U.S. Provisional Patent Application No. 62/125,872 entitled "Attachable Front for Eyeglasses", filed Feb. 2, 2015.

BACKGROUND OF THE INVENTION

For visual comfort outdoors, many people prefer eyeglasses with tinted lenses (commonly called "sunglasses"). For those who wear prescription ("Rx") eyeglasses, this preference motivates the purchase of at least one additional pair of eyeglasses. Since Rx eyeglasses are relatively expensive, and it is often inconvenient to carry a second pair, an alternative has become popular; namely, the use of an attachable front that 'clips onto' the user's clear Rx spectacles (herein "parent" glasses). The attachable front preferably carries tinted lenses with no optical power.

When in use, it is important that jostling does not inadvertently detach the attachment from its parent. And for user convenience when not being worn, it is preferred that the attachment can be stored compactly.

With prior art attachments, the considerations mentioned above cause cosmetic/fit-up issues since, as dispensed, for each style of Rx spectacles the curvature of the eye openings of various pairs can differ markedly from one to another. This variation arises because the three dimensional front curvature (the "base curve") of a prescription lens depends on its required optical performance, which varies substantially in the populace. Hence each eye opening of a frame into which Rx lenses are being installed must often be 'reformed' by the dispenser to enable proper lens positioning. For this reason Rx eyeglasses with prior art attachments usually have an obvious gap between the lenses of the parent and the lenses of the attachment, and hence do not have the appearance of true sunglasses, looking instead like glasses with a double set of lenses. The gap between parent frame and attachment is not only unsightly, but also allows light leakage and troubling internal reflections.

The invented attachment described herein eliminates these deficiencies. In addition, while suitable for converting clear eyeglasses into sunglasses, the invented attachment is not limited to that use. Other applications include, for example, providing on-demand a second (or third) optical power.

SUMMARY OF THE INVENTION

The invented attachment is described herein in the context of converting clear Rx eyeglasses into Rx sunglasses (via zero optical power tinted lenses), but it will be understood that the invention is applicable as well to attachments with lenses having optical power, tinted or not, for other applications.

For convenience, relative directions mentioned herein are stated with reference to a hypothetical standing eyeglass wearer. The term "frontward", and similar, refer to the direction away from the wearer; "rearward", and similar, refer to the direction toward the wearer; "downward", and similar, indicate toward the earth. Other directions are to be taken consistent with the foregoing.

"Propellering" means an incidental twist along a horizontal axis of the front of a frame (causing it to look somewhat like the propeller of an airplane); and "flapping" indicates an incidental bending, about a vertical axis, of one eye opening with respect to the other. "Vertical" is the up/down direction with respect to a standing wearer.

As applied to a rim, the term "width" refers to a quasi-radial dimension; as applied to a magnet, this term refers to the as-installed dimension most nearly aligned with the width of the nearest portion of the rim. As applied to a portion of a rim, the term "length" refers to a circumferential direction; as applied to a magnet, the term "length" refers to the magnet's as-installed dimension in the direction along that circumference. As applied to a magnet, the term "thickness" refers to the magnet's as-installed dimension in the front/rear direction. The terms "eyeglasses", "glasses" and "spectacles" are used interchangeably. The term "lens" herein refers to a transparent lens-like item, whether or not it has optical power, and whether or not it is tinted. And the term "lens unit" refers to a lens and rim combination.

The preferred embodiment of the attachment as described herein is comprised of two substantially identical lens units, except that each is the mirror image of the other, connected by a bridge. In the presently preferred embodiment described herein, each lens unit is coupled to the bridge via a ball joint, thereby permitting the attachment to fold compactly for ease in transport and storage. The term "ball joint" as used herein is meant to refer to a rotatable joint involving a substantially spherical external surface that slidably mates with a substantially spherical internal surface. The joint has essentially a single degree of freedom, the primary rotation being about a vertical axis. However, some limited motion about other axes is also possible. The substantially spherical surfaces are preferably either caps or segments of a sphere.

The preferred method of latching the attachment to its parent frame is via magnets that are attracted to the front face of the corresponding rim of a parent frame. Accordingly each rim of the parent frame is preferably made of a ferromagnetic material; for example, type 430, 434 or other 400 series stainless steel. Alternatively, the rim of the parent frame may be made of plastic with a ferromagnetic insert or inlay. The attachment includes a plurality of preferably rare earth magnets preferably disposed along the quasi-vertical outboard edge of each lens unit. The term "quasi-vertical" means that a member's orientation has a vertical component greater than its horizontal component. The presently preferred number of magnets is four per outboard edge, but other numbers may be used. To best achieve the advantages of the present invention, no fewer than two magnets should be included in each outboard edge of a lens unit.

The magnets in the attachment preferably have frontal dimensions which (in the radial direction) are larger than the corresponding dimensions of the mating parent frame (or the magnetic insert in the case of the alternate construction disclosed), and the attachment preferably includes 'skirts' which extend primarily rearward from its front surfaces and cover the parent frame (completely, or partially). The term "cover" (including its variants) is intended to refer to the overlap of the attachment with respect to the parent frame. Compared with prior art attachments, these skirts (including the corresponding portions of the attachment bridge) are deeper and more comprehensive. For this reason, when in use, the attachment truly envelops the entire (or at least most of the) front of its parent frame, thereby i) hiding substantially all of the parent frame's visual aspects (including the parent bridge), and ii) presenting (other than at the temples) no gaps between the attachment and the front of its parent, which would otherwise be visible when observing the wearer from his/her front, top, or side. This eliminates light leakage, and also actually transforms the appearance of the parent frame into that of a sunglass. Alternatively, the skirts could extend rearward to cover only a portion of the depth of the parent lens units. This latter construction, while perhaps not as attractive as the first embodiment described above, still eliminates the undesirable visual gap between the attachment and the parent frame.

Adequate magnetic latching without regard to the base curve of the lenses installed in the Rx parent frame is addressed, in part, by locating the magnets within or along the quasi-vertical outboard edges of the attachment (instead of, as is common in some prior art, within or along the quasi-horizontal edges). This provides a significant benefit because the variation in curvature along an eye opening is usually much less when viewed from the side than when viewed from the top.

Robust magnetic latching is further achieved by a magnet array that provides adequate latching force even when the rim of the corresponding parent frame deviates from its nominal as-manufactured location. As touched on previously, such deviation can arise from manufacturing tolerances, or from reforming the parent to accommodate specific Rx lenses (which can change not only curvatures but also the horizontal dimension between the outboard edges of the two lens units), or from wearer abuse.

The present invention utilizes magnet arrays which have a preferred nominal width that is at least 120% of the nominal width of the parent frame eyewire (or, correspondingly, the width of the alternative magnetic insert). As a consequence of the ball joints, it also provides unique mechanical compliance in the 'flapping' and 'propellering' directions. If desired to improve resistance to incidental shock in use, a downward-extending lip positioned behind the parent bridge may also be provided.

BRIEF DESCRIPTION OF THE DRAWING

FIG. 3 is a vertical cross sectional view of the bridge of the embodiment shown in FIG. 1 taken at 3-3 of FIG. 1. For clarity, only the cutting plane is shown.

FIG. 4 is a vertical cross sectional view of one of the lens units of the embodiment shown in FIG. 1, taken at 4-4 of FIG. 1. For clarity, only the cutting plane is shown.

FIG. 4A is a view similar to FIG. 4, but showing a different rim design.

FIG. 5 is a top fragmentary exploded view of the central portion of the embodiment shown in FIG. 1, showing the connection between the lens units and the bridge.

FIG. 6 is a rear fragmentary, partly sectioned, exploded view of the central portion of the embodiment shown in FIG. 1, showing the connection between the lens units and the bridge. The section is taken at 6-6 of FIG. 5.

FIG. 9 is a rear fragmentary view of a lens unit showing a plan view of the magnet pockets.

FIG. 10 is a fragmentary sectioned view of a lens unit taken at 10-10 of FIG. 9.

FIG. 11 is an enlarged view of one of the magnet pockets of FIG. 10, without a magnet installed.

DETAILED DESCRIPTION OF PRESENTLY PREFERRED EMBODIMENTS OF THE INVENTION

Figure 1:
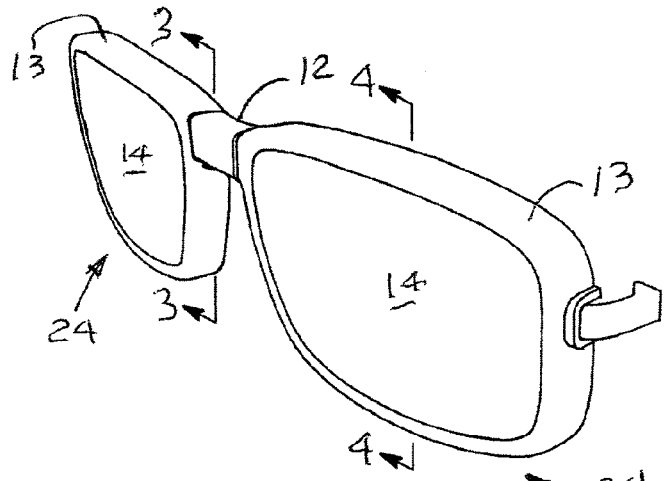
FIG. 1 is a perspective view of one embodiment of the invented attachment latched onto a parent frame.
Figure 1A:
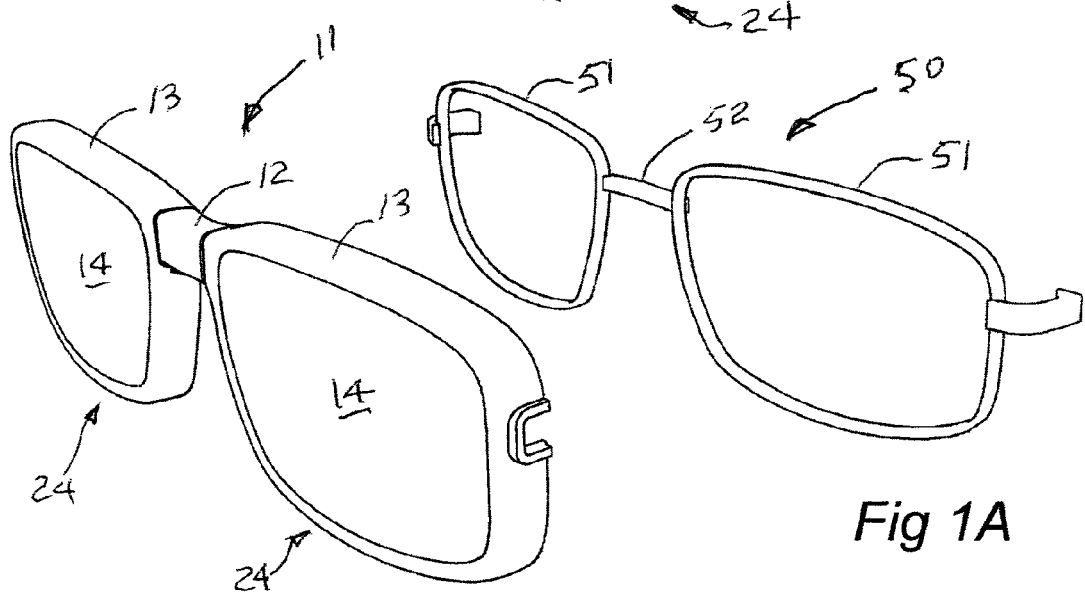
FIG. 1A is a view of the invented attachment similar to FIG. 1, except that the parent frame is shown separated from the attachment.

The perspective view of FIG. 1 shows a first embodiment of the invented attachment 11 as it is intended for use, installed on a parent frame 50. FIG. 1A shows the same attachment 11, with a parent frame 50, but separated. The preferred means of attaching is by magnetic attraction between magnets carried by the attachment lens units 24, and the rims 51 of the parent frame. The parent frame rims 51 in this first preferred embodiment are preferably fabricated from a ferromagnetic material such as, for example, type 430 stainless steel.

Figure 2:
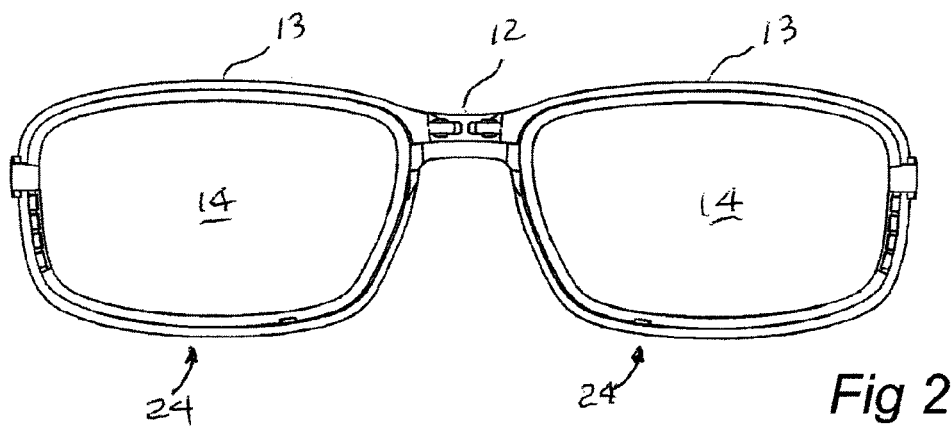
FIG. 2 is a rear view of one embodiment of the invented attachment.
Figure 7:
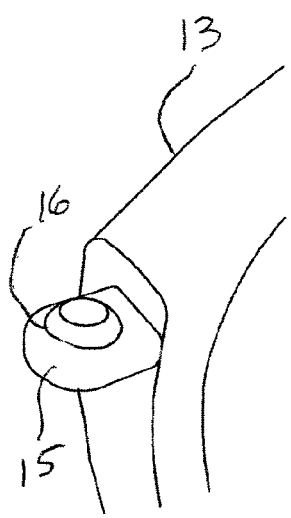
FIG. 7 is an oblique fragmentary view of one lens unit showing details of the connection to the bridge.

As can be seen in FIG. 1A, the invented eyeglass attachment includes two lens units 24 and a bridge 12. For clarity both lens units are numbered 24, even though they are not actually identical but rather are mirror images of each other. Also, the bridge is denoted as 12, indicating either one of the two somewhat different bridge designs described. Other bridge designs within the present invention are also contemplated. Each lens unit 24 is comprised of a rim 13, a lens 14, and (as can be seen in FIG. 2) a plurality of magnets, 22. Depending on the intended application, the lenses may or may not have optical power, and also may or may not be tinted.

Referring to FIGS. 3 and 4 it can be seen that the attachment rims 13, and bridge 12, also include skirts (25, 26) of sufficient depth that when the attachment is mated to its parent, other than at the temples no part of the parent frame is (preferably) visible to onlookers. This offers cosmetic benefit and also eliminates the possibility of light intrusion between the attachment and its parent. Alternatively, only some, but not all, of the parent frame's depth is covered. This alternative construction is illustrated in FIG. 4A, where skirts 26A can be seen as covering only a portion of rim 51.

The attachment rims 13 are coupled to the bridge 12 through tongues 15 (FIGS. 5 and 6). Each tongue 15 includes projections 16 (from the top and bottom of the tongue), each preferably shaped in the form of a segment of a sphere. For ease of assembly, each projection is preferably truncated, resulting in a small flat top. The illustrated truncations are only a convenience, however, and may not, in all cases be necessary or desired (that is, the projections may have surfaces representing either segments or caps of a sphere). While not presently preferred, each tongue could have only one projection (e.g., on the top of each tongue, or on its bottom).

The spherically shaped projections 16 (whether segments or caps) mate with spherically shaped recesses 17 in the bridge 12 to form ball joints 16/17. The tongues and ball joints permit the attachment to fold for storage when not in use, and also provide mechanical compliance to facilitate magnetic latching to a parent which may be somewhat deformed in the propellering and/or flapping directions. The rims and the bridge of the attachment are preferably molded from suitable plastic materials, for example, nylon. As shown, for example, in FIGS. 6, 8A and 8B the bridge 12 preferably includes a septum 27. The septum serves to increase the stiffness of the flanges of Bridge 12 which form recesses 17, and thereby improve the "feel" in the user's hand, of ball joints 16/17. The width of the septum is preferably in the range of 0.02" to 0.09".

Figure 8A:
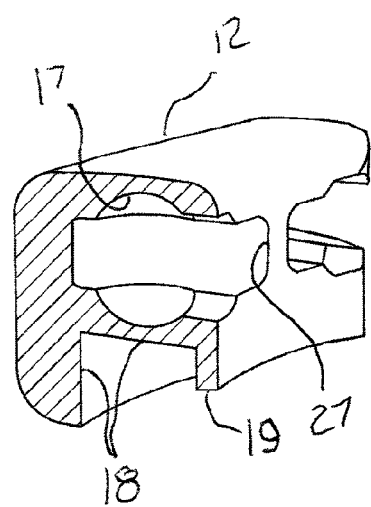
FIG. 8A is an oblique sectioned view of one form of bridge.
Figure 8B:
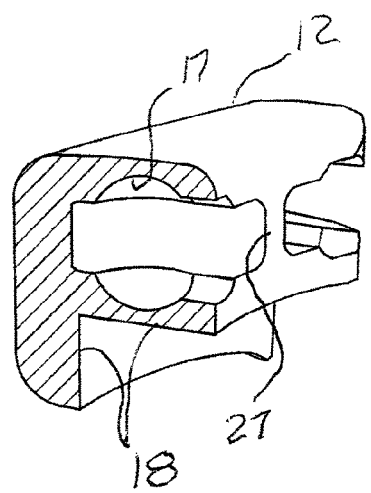
FIG. 8B is an oblique sectioned view of a second form of bridge.

As implied by FIGS. 8A and 8B (which show alternate constructions) when installed on a parent frame, feature 18 on the bottom of bridge 12 fits over and in front of bridge 52 of the parent frame. Optional lip 19 depends from the bridge and fits behind parent bridge 52 so as to retain the attachment in the event that the magnetic retention is transiently overcome by a very strong shock.

FIGS. 9, 10, and 11 illustrate the preferred magnet array. The following describes the presently preferred magnet array configuration, however, many other magnet array configurations are possible, which arrangements will result in varying magnetic latching forces, depending on the arrangement. While designing to achieve adequate magnetic latching with the parent frame, (understanding that the parent frame may have to be deformed from its as-manufactured shape and hence cannot fit snugly against the magnet-bearing region of the attachment), conflicting requirements arise. We have found that adequately strong latching can be achieved, despite a somewhat reduced magnet mass which might otherwise be installed near each quasi-vertical outboard edge, by a) dividing the region, into which magnets are to be emplaced, into discrete and more-or-less collinear pockets, each separated from the next by a non-magnetic wall; b) poling each magnet through its thickness, and c) mounting the magnets to expose alternating North and South poles to the eyewire along the length of the array. In the resulting magnet array the inter-pocket walls each provide two primary functions: i) they set a specific gap between each North/South pole pair, thereby forcing the magnetic field spanning this gap to extend relatively deeply into the adjacent space (which enables onset of latching force even when the parent is reasonably distant); and ii) they create pockets, each of which are adequately stiff to retain a magnet by friction (i.e., without need for adhesive). The inter-magnet gaps also establish multiple latching locations, which can itself be a benefit. Another benefit is the ability to manufacture the attachment without use of adhesives. Preferred inter-pocket wall spacing depends on the dimensions of, and material from which, the magnets are manufactured, and also on the resin from which the attachment is molded. Generally speaking this spacing is preferably more than about 0.003", and less than about twice the thickest magnet thickness. More preferably the magnets are spaced in the range of 0.01" to 0.03".

FIGS. 9 and 10 illustrate a preferred magnet array. In this case the preferred number of magnets is four, but other configurations of parent frame {and, hence, corresponding configurations of attachment} could favor use of another number, perhaps two to six. An even number of magnets is preferred, but not essential. Each magnet is preferably of the rare earth type, and even more preferably made from NdFeB grade N48 or N52 material. FIG. 11 shows a typical magnet pocket before a magnet has been installed. Each magnet pocket 20 (see FIG. 11) is preferably sized such that a magnet 22 may be pressed in without breakage, and yet will be retained by frictional forces.

To assure that they do not scratch the rim of a mated parent frame (and yet not substantially reduce magnetic latching energy), the exposed face of each magnet is preferably located slightly below the adjacent rear surfaces of its corresponding pocket. In FIG. 10 this distance is shown exaggerated for clarity; it is preferably in the range of 0.0003" to 0.0012". A small groove 21 (which can best be seen in FIG. 11) is preferably molded into the wall or at a corner of each magnet pocket, so that air may escape from below each magnet when it is being pressed into place.

As mentioned above, the distance between the outboard quasi-vertical edges of multiple instances of a given style of parent frame is subject to variation, in part because of manufacturing tolerances but also because dispensers reform parent rims to accommodate Rx lenses having different base curves. Accordingly, best to act in conjunction with the gaps in each magnet array, each magnet 15 should have a width somewhat wider than the width of the intended parent rim. That is, the magnets 15 preferably should have a width of at least 120% of the nominal face width of the rim of the intended parent frame (or inlay, as the case may be), and more preferably a width in the range of 120% to 150%.

Figure 12:
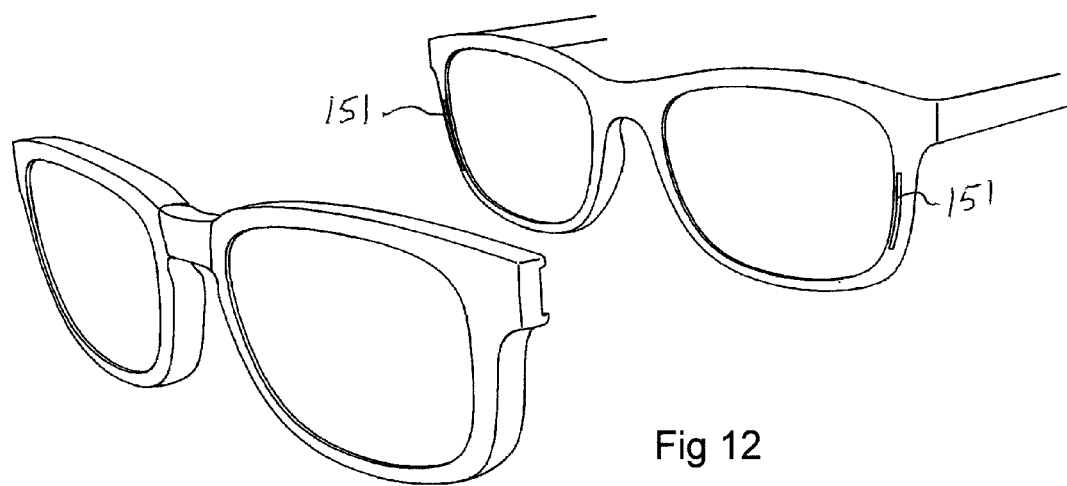
FIG. 12 is a view similar to FIG. 1A, but of a second embodiment.
Figure 13:
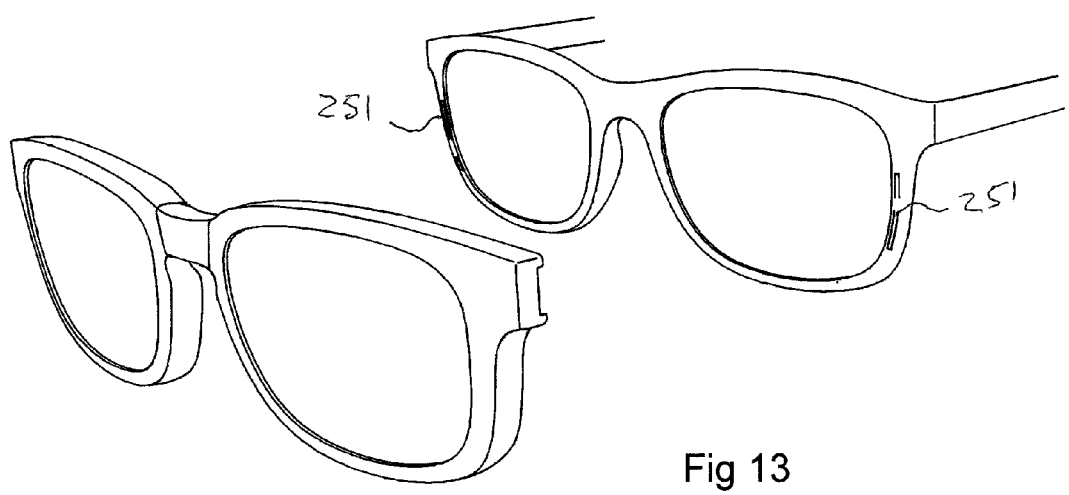
FIG. 13 is a view similar to FIG. 1A, but of a third embodiment.

In order to illustrate the design flexibility of the present invention, a somewhat different stylistic design of the parent and attachment is shown in FIGS. 12 and 13.

FIG. 12 illustrates a second embodiment of the invention wherein the parent frame rims, instead of being fabricated primarily from metal, are fabricated primarily from a suitable plastic material, such as, e.g., nylon. In order to provide a magnetic latching force, strips of ferromagnetic material (151), such as type 430 or 440 stainless steel are inlayed into the outboard vertical portions of the rims, located to match the locations of the magnets in the mating attachment.

FIG. 13 shows yet another embodiment of the invention wherein the ferromagnetic strips (251), rather than being inlayed in the rims, are embedded therein, so as to not be visible in the final product. For best results, the strips are preferably embedded with their front surfaces 0.010 inches or less below the rim front surface.

While the presently preferred embodiments of the invention have been described above, persons of skill in the art will realize that the invention, as claimed in the appended claims, can be practiced even though some particulars may be changed to suit particular circumstances. Such changed embodiments as fall within the terms of the claims or are equivalents thereof are intended to be covered hereby.

We claim:

1. An attachment for eyeglasses that comprises:
   a pair of lens units, each of said lens units including a lens and a rim;
   a bridge disposed between said lens units; and
   ball joints coupling said lens units to said bridge,
   wherein each of said ball joints includes a slidably movable surface connection between a respective lens unit and said bridge, a slidably movable surface connection being comprised of two surfaces slidable with respect to each other,
   wherein the slidable surfaces forming each of said slidably movable surface connections are substantially spherically shaped,
   wherein the slidable surfaces associated with said bridge are immovable with respect to each other, and
   wherein each of said ball joints has a primary vertical axis of rotation allowing said attachment to fold, and also has a secondary horizontal axis of rotation allowing said lens units to rotate with respect to each other in a propellering mode.

2. An attachment for eyeglasses as recited in claim 1 wherein the rim of at least one of said lens units has a tongue projecting therefrom, said tongue having one or two substantially spherically shaped external surface(s) thereon, said substantially spherically shaped external surface(s) being either segments or caps of a sphere.

3. An attachment for eyeglasses as recited in claim 2 where said substantially spherically shaped external surface(s) slidably mate with corresponding substantially spherically shaped internal surface(s) within said bridge.

4. An attachment for eyeglasses as recited in claim 1 wherein said attachment is intended for attachment to a parent pair of eyeglasses, and where said parent pair of eyeglasses includes a parent bridge, and where said bridge on said attachment includes a downwardly directed lip that engages said parent bridge behind said parent bridge to resist said attachment from being dislodged when said glasses are jostled.

5. An attachment for eyeglasses as recited in claim 1 where both said rims and said bridge are injection molded plastic.

6. An attachment for eyeglasses that comprises,
a pair of lens units, each said lens unit including a tongue projecting therefrom, each of said tongues having one or two substantially, spherically shaped external surfaces thereon; and
a bridge positioned between said lens units, said bridge including two or four substantially spherically shaped internal recesses,
said substantially spherically shaped external surfaces each slidably mating with a corresponding one of said spherically shaped internal recesses,
each of said lens units being rotatable with respect to said bridge about the vertical axis of its corresponding spherically shaped external surface and also rotatable about the implicit horizontal line between the centers of said spherically shaped surfaces.

7. An attachment for eyeglasses as recited in claim 6 wherein said substantially spherically shaped surfaces are either segments or caps of a sphere.

\* \* \* \* \*